US011968495B1

(12) United States Patent
Krueger

(10) Patent No.: US 11,968,495 B1

(45) Date of Patent: Apr. 23, 2024

(54) TECHNIQUES FOR LOUDSPEAKER CONSTRAINED ACOUSTIC MODULATOR (CAM)

(71) Applicant: Paul M. Krueger, St. Petersburg, FL (US)

(72) Inventor: Paul M. Krueger, St. Petersburg, FL (US)

( * ) Notice: Subject to any disclaimer, the term of this patent is extended or adjusted under 35 U.S.C. 154(b) by 0 days.

(21) Appl. No.: 18/330,146

(22) Filed: Jun. 6, 2023

Related U.S. Application Data

(63) Continuation of application No. 17/980,454, filed on Nov. 3, 2022.

(60) Provisional application No. 63/333,436, filed on Apr. 21, 2022, provisional application No. 63/310,573, filed on Feb. 15, 2022.

(51) Int. Cl.

| | |
|---|---|
| ***H04R 1/28*** | (2006.01) |
| ***H04R 7/20*** | (2006.01) |
| ***H04R 7/26*** | (2006.01) |

(52) U.S. Cl.

CPC ......... *H04R 1/2811* (2013.01); *H04R 1/2819* (2013.01); *H04R 1/2834* (2013.01); *H04R 1/2842* (2013.01); *H04R 1/2869* (2013.01); *H04R 7/20* (2013.01); *H04R 7/26* (2013.01); *H04R 2499/11* (2013.01)

(58) Field of Classification Search

CPC .. H04R 1/2811; H04R 1/2815; H04R 1/2819; H04R 1/2834; H04R 1/2842; H04R 1/2869; H04R 7/20; H04R 7/26; H04R 2499/11

See application file for complete search history.

(56) References Cited

U.S. PATENT DOCUMENTS

| | | | | |
|---|---|---|---|---|
| 5,749,433 | A * | 5/1998 | Jackson | H04R 1/2834 181/156 |
| 2001/0026628 | A1* | 10/2001 | D'Hoogh | H04R 7/08 381/345 |
| 2021/0258668 | A1* | 8/2021 | Lu | H04R 7/12 |
| 2022/0103934 | A1* | 3/2022 | Ilkorur | H04R 1/1041 |

* cited by examiner

*Primary Examiner* — Huyen D Le

(74) *Attorney, Agent, or Firm* — Jefferson IP Law, LLP; Raymond B. Persino

(57) ABSTRACT

A loudspeaker is provided. The loudspeaker includes an enclosure including an opening, a driver, disposed at the opening in the enclosure, which is configured to be electrically driven. and a constrained acoustic modulator (CAM), disposed at the enclosure, which is not configured to be electrically driven. The CAM is configured to tune the enclosure without the CAM substantially radiating audible sound.

18 Claims, 7 Drawing Sheets

TECHNIQUES FOR LOUDSPEAKER CONSTRAINED ACOUSTIC MODULATOR (CAM)

CROSS-REFERENCE TO RELATED APPLICATION

This application is a continuation of U.S. patent application Ser. No. 17/980,454 filed on Nov. 3, 2022; which is based on and claims priority under 35 U.S.C. § 119(e) of U.S. Provisional Application Ser. No. 63/310,573 filed on Feb. 15, 2022, and U.S. Provisional Application Ser. No. 63/333,436 filed on Apr. 21, 2022, the disclosure of each of which is incorporated by reference herein in its entirety.

BACKGROUND

1. Field

The present disclosure relates to a loudspeaker. More particularly, the present disclosure relates to techniques for a loudspeaker constrained acoustic modulator (CAM).

2. Description of Related Art

A loudspeaker is an electromechanical device that converts an electrical signal into sound. There are numerous types of loudspeakers in the related art. Among the more common type of loudspeakers, is a loudspeaker comprising a driver that is coupled to an enclosure and/or baffle. The driver vibrates in response to an electrical signal, thereby producing front and rear sound waves. Some drivers are specifically designed to reproduce the sound for a particular range of frequencies. For example, some drivers are designed to produce mid or low frequencies while others are designed to reproduce the upper frequency range. Often these various drivers are used together in a single loudspeaker. When used together, these various drivers may be augmented through the use of crossover electronic elements, serving to divide the frequencies sent to each driver from an input source. The purpose of the enclosure or baffle is to provide a mounting area as well as separate the front and rear sound waves to provide a usable and wide frequency response. Without an enclosure or large baffle, the front and rear sound waves will combine destructively, making the output sound, particularly in the low frequencies, virtually inaudible. It is therefore then the goal of the loudspeaker enclosure to control the front and rear waves such that they combine in a constructive fashion, reinforcing frequencies and output sounds that are not reproduced by one wave or the other exclusively, or not combine at all.

One type of loudspeaker implements an “infinite baffle” design. In an “infinite baffle” design, direct radiating loudspeakers are mounted to a surface facing the listening position. The infinite baffle is a board or similar structure, typically of several meters in width and height, to which the loudspeaker is affixed. The infinite baffle is used to separate the front and rear waves of the loudspeaker. A loudspeaker based on an infinite baffle design is a non-resonant design, whereby the air propagation of the cone is not harnessed in an enclosure, and the air volume of the enclosure is not utilized to damp the cone of the loudspeaker. Nevertheless, this design is noted for producing an open sound, but is limited in power handling, sound pressure (e.g., decibel) output, and excessive size. In addition, this design can only be fully realized indoors, and is strongly reliant on the effect of room placement and coupling.

Another type of loudspeaker separates the front and rear sound waves by virtue of a sealed enclosure, wherein the rear wave is confined within the enclosure, serving to reinforce the cone of the driver acting as an air spring. This is often referred to as acoustic suspension, sealed, and is derivative of the “infinite baffle” design. This compact design, while easy to build and tune, is notoriously inefficient, and limits low bass frequencies. This design can produce unwanted panel resonances or reflections within the enclosure that can be reflected back through the driver as well as non-linearities in the driver itself caused by the high air pressure changes in the enclosure. Other designs include the features of the acoustic suspension, but use “tuning devices” and related methodology, for example, an enclosure opening (e.g., port) sometimes including a tube or slot (e.g., a Helmholtz resonator), an Aperiodic Vent, or a passive radiator driver to reinforce the front wave, in most cases, allowing low frequencies to emanate from the port or radiator and dampen the driver at its resonance frequency. These “tuning devices” and related methods are additional features that are attached to. or are at least interacting with part of the enclosure, and are utilized to improve loudspeaker performance at lower frequencies.

Passive radiators are bass enhancement devices that do not rely on electrical signal input but rather react to air pressure input exerted on them directly or indirectly, originating from a powered (active) loudspeaker driver. Passive radiators are commonly known as “drone cones” and are utilized in lieu of “ports” in bass-reflex designs where more compact enclosures are required. Passive radiator designs are relatively effective at reproducing low frequencies but have drawbacks such as lower efficiency and frequency smearing due to phase cancellations. Passive radiators are commonly mounted to the exterior of the loudspeaker enclosure and radiate directly into the listening space. Some designs mount multiple passive radiators inside a speaker enclosure attached directly to a vent “port” device that radiates into the listening space.

The execution of passive radiator designs relies on the basic concept that the passive radiator has approximately twice (2×) the compliance of the active loudspeaker driver. To state it another way, a single passive radiator has commonly twice the cone surface area of the active driver, or has a much more compliant suspension than that the active driver. Moreover, the passive radiator is designed to radiate bass frequencies into the listening environment and produce audible sound. Still other techniques use combination of a larger cone, multiple passive radiators, and more compliant suspensions. In any event, the sum of the compliance factors must achieve a summed compliance approximately 2× the compliance of the active, powered speaker driver. Still other loudspeaker designs utilize another tuning device called an Aperiodic Vent, which allows some air to escape the speaker enclosure but serves to tune the enclosure to a lower frequency that a sealed enclosure by itself.

Still another design is a waveguide enclosure (transmission line) whose length is determined by a formula of ¼ the wavelength of the chosen driver’s resonance frequency, is designed as a labyrinth, and is typically constructed with an average cross-sectional area 1.5-3.0 times the size of the driver. Extensive acoustical stuffing material is utilized for tuning purposes. The purpose of “stuffing” is to destroy unwanted high and middle frequencies from emanating from the rear wave and out an enclosure opening (e.g., port), where only low frequencies will exit, and recombine constructively with the front wave. “Stuffing”, however; creates manufacturing problems related to repeatability, loss of efficiency, and tuning reliability issues if the stuffing moves inside the enclosure.

The tuning of these enclosures is known and can be reproduced through a defined formula. These designs are limited in producing a free and natural bass response, especially in the upper and mid bass regions, and produce unwanted panel resonances and standing waves.

All of these designs call for an active, powered loudspeaker driver and the enclosure is tuned by manipulation of a number of variables. Tuning a loudspeaker enclosure requires variation in enclosure internal volume and geometry, "tuning enhancement devices" such as ports or passive radiators, or a combination of both, with specific formulaic relationships based on loudspeaker driver parameters. These parameters are typically called Thiele-Small parameters. Designs that disregard or substantially modify the formulaic recommendations, for example, a loudspeaker enclosure with reduced recommended internal volume, normally results in poor performance.

Loudspeakers by their very nature are compromises; with no one design embodying all of the desired characteristics of the listener.

The above information is presented as background information only to assist with an understanding of the disclosure. No determination has been made, and no assertion is made, as to whether any of the above might be applicable as prior art with regard to the disclosure.

SUMMARY OF THE DISCLOSURE

Aspects of the disclosure are to address at least the above-mentioned problems and/or disadvantages and to provide at least the advantages described below. Accordingly, an aspect of the disclosure is to provide techniques for a concentric loading loudspeaker.

In accordance with an aspect of the disclosure, a loudspeaker is provided. The loudspeaker may include an enclosure including an opening, a driver, disposed at the opening in the enclosure, which is configured to be electrically driven. and a constrained acoustic modulator (CAM), disposed at the enclosure, which is not configured to be electrically driven. The CAM may be configured to tune the enclosure without the CAM substantially radiating audible sound.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
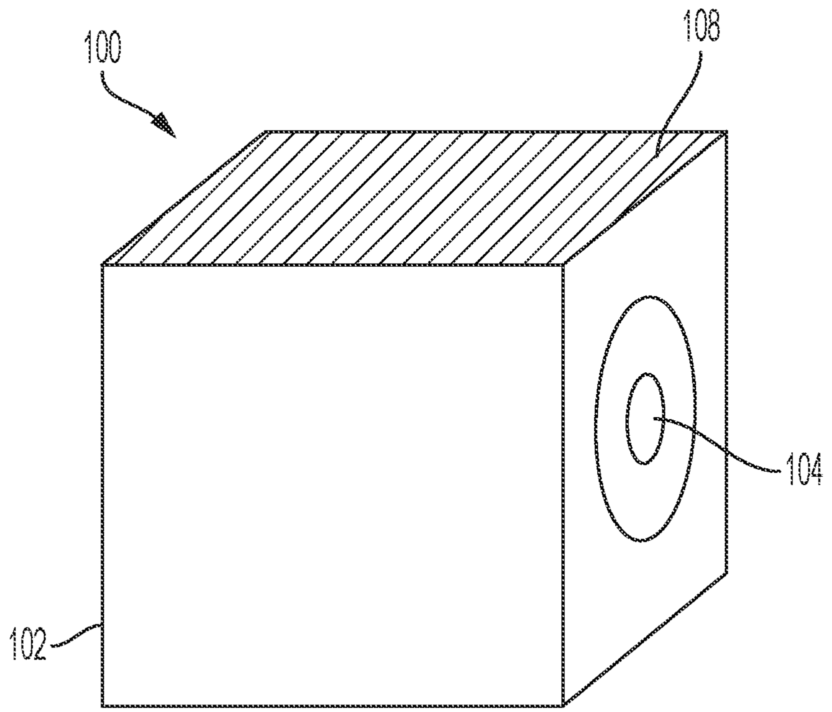
FIGS. 1A and 1B illustrate a loudspeaker employing a constrained acoustic modulator (CAM) according to an exemplary embodiment.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1A, 1B, 2A, 2B, 3A, 3B, 4A, 4B, 5A, 5B, 6A, 6B, 7A, and 7B discussed below, and the various embodiments used to describe the principles of the disclosure in this patent document are by way of illustration only and should not be construed in any way that would limit the scope of the disclosure. Those skilled in the art will understand that the principles of the disclosure may be implemented in any suitably arranged communications system. The terms used to describe various embodiments are exemplary. It should be understood that these are provided to merely aid the understanding of the description, and that their use and definitions in no way limit the scope of the disclosure. Terms first, second, and the like are used to differentiate between objects having the same terminology and are in no way intended to represent a chronological order, unless where explicitly stated otherwise. A set is defined as a non-empty set including at least one element.

The disclosure is directed to techniques for a loudspeaker constrained acoustic modulator (CAM). The techniques for a loudspeaker CAM may be directed to tuning and related methodology in loudspeaker design to augment and improve loudspeaker performance.

A loudspeaker employing a CAM may have advantages in reproducing mid to low frequencies. A loudspeaker employing the CAM according to an exemplary embodiment may be a stand-alone speaker. When implemented as a stand-alone speaker, the loudspeaker employing the CAM may use a full range driver, or a driver suited to reproduction of mid to low frequencies (e.g., a subwoofer). In addition, the loudspeaker employing the CAM according to an exemplary embodiment may be a mid or low frequency section of a full range loudspeaker system in either separate enclosures or a common enclosure. Further, the loudspeaker employing the CAM may be implemented in a wide range of sizes. For example, the loudspeaker employing the CAM may be utilized in any type of device that reproduces audio, such as in headphones, portable Bluetooth speakers, devices such as the Amazon Alexa, Google Play or Apple Homepod, handheld electronic devices such as mobile phones and portable gaming devices, laptop or desktop computers, televisions, automobiles, planes, trains, and boats. Also, the loudspeaker employing the CAM may be utilized in full size speakers for home audio, home theater, commercial theaters, concert venues, and the like.

The CAM may allow a loudspeaker driver to be affixed to an enclosure of smaller internal volume than would be required by a sealed or ported design. The CAM may enable the loudspeaker driver to operate in the enclosure as if it is in an infinite baffle in the majority of its frequency range while mitigating over excursion. Here, the CAM may allow the loudspeaker driver to achieve freer movement within a limit. The CAM may achieve this by adding a flexibility to the enclosure volume that serves to equalize the volume of the enclosure. The CAM may serve as an additional suspension of the loudspeaker driver or an extension of the suspension of the loudspeaker driver, to thereby function as an air spring. The CAM may serve as a shock absorber that cancels out resonances and vibrations. In addition, the CAM may at least one of augment or smooth overall frequency response characteristics so as to improve overall loudspeaker performance. Unlike related art techniques for tuning, the CAM may not itself be intended to radiate sound, and any radiated sound may be minimal and incidental.

Figure 1B:
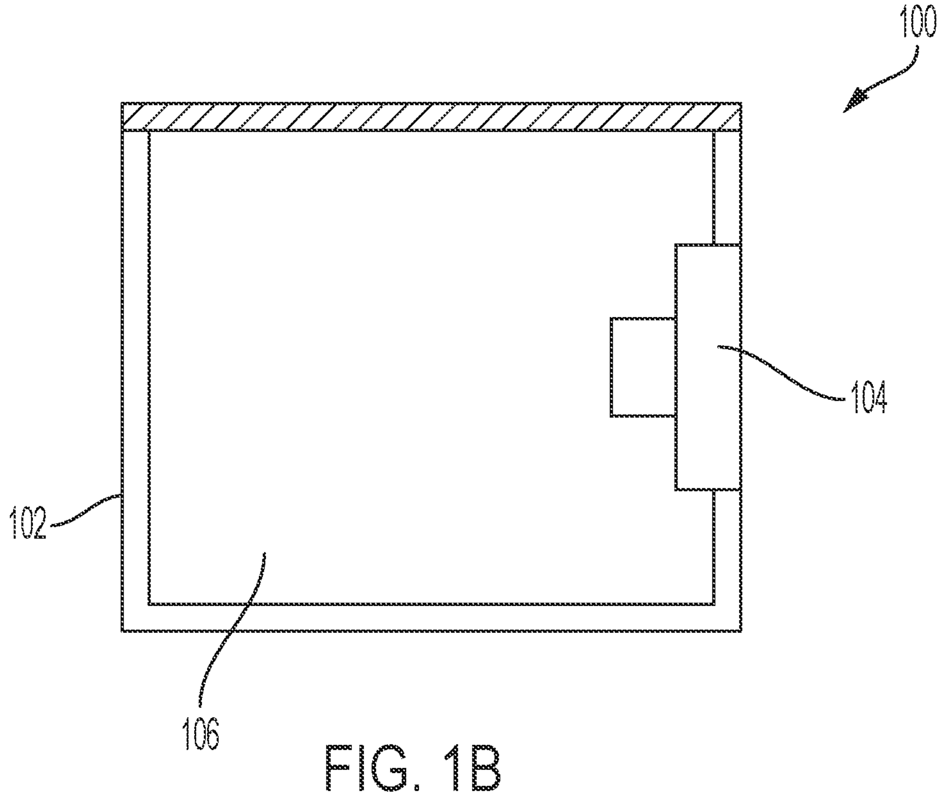

FIGS. 1A and 1B illustrate a loudspeaker employing a CAM according to an exemplary embodiment.

Referring to FIGS. 1A and 1B, a loudspeaker includes an enclosure 102 having at least one wall forming a void 106, at least one driver 104, and at least one CAM 108.

While the enclosure 102 is shown in FIGS. 1A and 1B as being cubed shape, the enclosure 102 may have any shape that forms the void 106 (e.g., a cylinder, a rectangular prism, pyramid, etc.).

The enclosure 102 may be an entity of the enclosure 102, or part of a larger enclosure. The enclosure 102 may be constructed of any material, and may include bracing. At least a portion of the interior walls of the enclosure 102 may be lined with a fibrous sound-absorbing material of approximately ¼-½ inch in thickness. At least a portion of the inside of enclosure 102 may be at least partially stuffed with fibrous sound-absorbing material. In cases where fibrous sound-absorbing material is employed, varying the amount of fibrous sound-absorbing material may vary the tuning. Accordingly, tuning may be at least partially achieved by varying the amount of fibrous sound-absorbing material, that amount of sound-absorbing material may be determined by trial and error. The fibrous sound-absorbing material when stuffed or lined may dampen any possible resonance generated and attenuates higher frequencies. The fibrous sound-absorbing material may be formed of polyester, nylon, fiberglass or any other sound-absorbing. The enclosure 102 may include at least one passive radiator. The enclosure 102 may include a port from inside the void 106 to outside the enclosure 102. The port may have at least one of a length or cross-sectional area determined by the target low frequency. The port may have a wall of at least one of a substantially constant thickness over at least one of its cross-sectional shape or length, or a thickness that varies over at least one of its cross-sectional shape or length.

The void 106 may be airtight. The void 106 may be formed in the enclosure 102 by enclosure 102, the driver 104, and the CAM 108. In the case in which the void 106 is airtight, the air pressure in the void 106 may be greater than, the same as, or lower than the air pressure outside the enclosure. Alternatively, the void 106 may not be airtight due to the enclosure 102 including the port from inside the void 106 to outside the enclosure 102.

The driver 104 is configured to generate sound waves in the void 106 inside the enclosure 102. The driver 104 may be disposed at an opening in the enclosure 102. The driver 104 may be mounted to an inner side of the enclosure 102, in line with the enclosure 102, or to an outer side of the enclosure 102. The driver 104 may be mounted to the enclosure 102 via a bracket. The driver 104 may be mounted to the enclosure 102 so as to face the void 106 or face away from the void. The driver 104 may be a circular diver, square driver, or a driver of any shape. The driver 104 may be a plurality of drivers mounted in a baffle affixed to the enclosure 102 or at respective separate openings in the enclosure 102. In the case in which a plurality of drivers are provided, the plurality of drivers may be disposed on a same side of the enclosure 102 or disposed on different sides of the enclosure 102. The driver 104 may be a plurality of drivers mounted in an isobaric or push-pull configuration. The driver 104 may be configured as a full range driver or a limited range driver (e.g., subwoofer). The driver 104 may include a sound penetrable protective cover such as a grate, a grill, cloth, a screen, or the like. When implemented with the sound penetrable protective cover, the sound penetrable protective cover may be configured to operate as a protective barrier for the driver 104.

The CAM 108 may be disposed at an opening in the enclosure 102, and may be disposed at any position or orientation relative to the driver 104. For example, the CAM 108 may be disposed perpendicular to the driver 104 as shown in FIGS. 1A and 1B. In another example, the CAM 108 may be disposed parallel to the to the driver 104.

The opening in the enclosure 102 where the CAM 108 is disposed may have any shape, e.g., circle, oval, rectangle, etc. The opening in the enclosure 102 may be an opening in the wall of the enclosure 102, or may be an entire side of the enclosure 102. The CAM 108 may be a plurality of CAMs mounted in a baffle or bracket affixed to the enclosure 102 or at respective separate openings in the enclosure 102. In the case in which a plurality of CAMs are provided, the plurality of CAMs may be disposed on a same side of the enclosure 102 or disposed on different sides of the enclosure 102.

The CAM 108 may include at least one of a movable or stretchable portion. The CAM 108 may function by providing an acoustic resistive force to counteract an acoustic wave from the driver 104, that at least one of radiates inside the enclosure 102 or pressurizes the air inside the void 106. The CAM 108 may provide a mass loaded resistive force at certain frequencies and may serve to lower the loudspeaker total quality factor, or Qtc, for a given internal volume of enclosure 102. The resistive force of the CAM 108 may be maximized at lower frequencies whereby the CAM 108 will vibrate and provide constructive resistance to large driver 104 excursions (e.g., bass frequencies), thereby reducing distortion and may provide lower bass response for a given volume of enclosure 102. At higher frequencies the CAM 108 may serve to dampen resonances of the enclosure 102 and eliminate non-musical artifacts and distortions.

The CAM 108 may be constrained via at least one of elasticity of a material used in the CAM 108, a mass use in the CAM 108, or a mechanical restraint in the CAM 108, or air pressure against the CAM 108.

Unlike a conventional passive radiator, the vibration of the CAM 108 is not intended to, and does not function as an acoustic passive radiator, and produces little to no sound. Rather, the CAM 108 may serve to tune at least one of the enclosure 102 or the driver 104, and not to radiate sound. Any radiated sound may be minimal and incidental.

The CAM 108 will be described further below with reference to FIGS. 4A, 4B, 5A, 5B, 6A, 6B, 7A, and 7B.

Figure 2A:
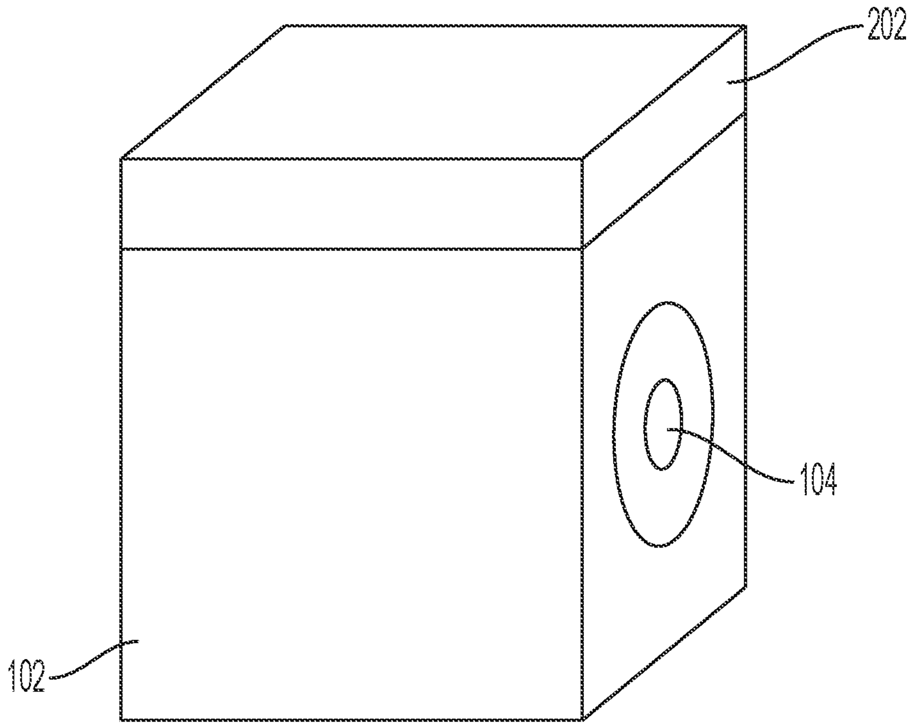
FIGS. 2A and 2B illustrate a loudspeaker employing a CAM according to an exemplary embodiment.
Figure 2B:
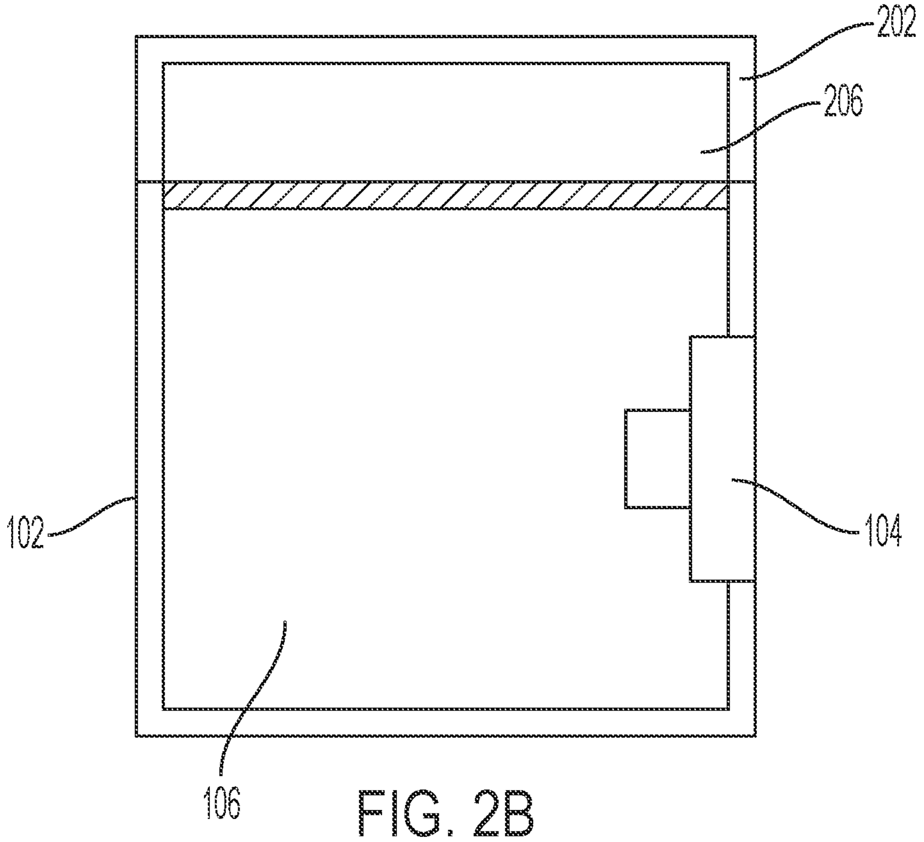

FIGS. 2A and 2B illustrate a loudspeaker employing a CAM according to an exemplary embodiment.

FIGS. 2A and 2B include elements that are substantially similar to those described with respect to FIGS. 1A and 1B, and thus a description of those elements will not be repeated. However, FIGS. 2A and 2B include two additional elements not shown in FIGS. 2A and 2B. In particular, the loudspeaker shown in FIGS. 2A and 2B include a secondary enclosure 202 having a wall that forms a secondary void 206.

The secondary enclosure 202 may be disposed such that the secondary void 206 is formed on a side of the CAM 108 opposite the void 106. The secondary void 206 may be airtight and may provide a resistive load to the CAM 108. The secondary enclosure 202 may be formed separate from the enclosure 102, or may be integrally formed with the enclosure 102. In the case in which the secondary void 206 is airtight, the air pressure in the secondary void 206 may be greater than, the same as, or lower than the air pressure outside the enclosure. Further, the air pressure in the secondary void 206 may be the same as or different than the air pressure in the void 106. In addition, the volume of the secondary void 206 may be the same as or different than the volume of the void 106. In the case in which the volume of the secondary void 206 different than the volume of the void 106, the volume of the secondary void 206 may be lessor than the volume of the void 106, or the volume of the secondary void 206 may be greater than the volume of the void 106.

The secondary enclosure 202 may be an entity of the secondary enclosure 202, or part of a larger enclosure. The secondary enclosure 202 may be constructed of any material, and may include bracing. At least a portion of the interior walls of the secondary enclosure 202 may be lined with a fibrous sound-absorbing material of approximately ¼-½ inch in thickness. At least a portion of the inside of the secondary enclosure 202 may be at least partially stuffed with fibrous sound-absorbing material. In cases where fibrous sound-absorbing material is employed, varying the amount of fibrous sound-absorbing material may vary the tuning. Accordingly, tuning may be at least partially achieved by varying the amount of fibrous sound-absorbing material, that amount of sound-absorbing material may be determined by trial and error. The fibrous sound-absorbing material when stuffed or lined may dampen any possible resonance generated and attenuates higher frequencies. The fibrous sound-absorbing material may be formed of polyester, nylon, fiberglass or any other sound-absorbing. The secondary enclosure 202 may include at least one passive radiator. The secondary enclosure 202 may include a port from inside the secondary void 206 to outside the secondary enclosure 202. The port may have at least one of a length or cross-sectional area determined by the target low frequency. The port may have a wall of at least one of a substantially constant thickness over at least one of its cross-sectional shape or length, or a thickness that varies over at least one of its cross-sectional shape or length. The secondary enclosure 202 may include one or more additional drivers. In the case in which the one or more additional drivers are included with the secondary enclosure 202, the one or more additional drivers may operate opposite to the driver 104, or in sync with the driver 104.

The CAM 108 may be disposed parallel to or in a cross-sectional plane of at least one of the enclosure 102 or secondary enclosure 202 as shown in FIGS. 2A and 2B, or may be disposed at an angle offset from a cross-sectional plane of the enclosure 102 and the secondary enclosure 202. In this case, when the enclosure 102 is a cube, the CAM 108 may be rectangular instead of square, thereby increasing the size of the CAM 108. In another case, when the enclosure 102 is a shape such as a cylinder, the CAM 108 may be an oval instead of circle, thereby increasing the size of the CAM 108. When CAM 108 is disposed at an angle offset from a cross-sectional plane of at least one of the enclosure 102 or the secondary enclosure 202, this allows a CAM 108 to be installed having a greater surface area than the CAM 108 disposed parallel to or in a cross-sectional plane of at least one of the enclosure 102 or the secondary enclosure 202. A frame 304 may be employed to couple the CAM 108 to at least one of the enclosure 102 or the secondary enclosure 202.

Figure 3A:
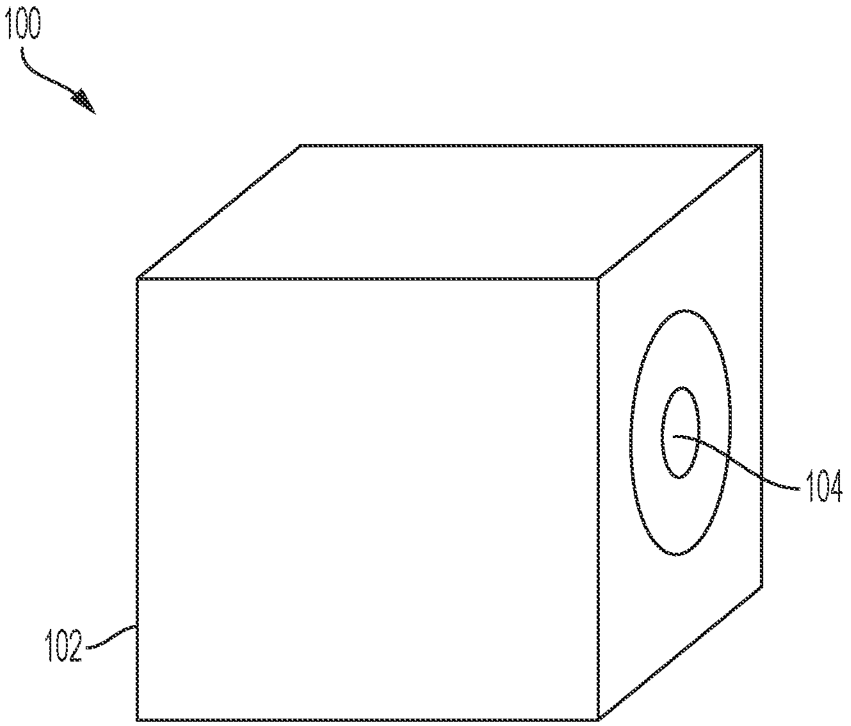
FIGS. 3A and 3B illustrate a loudspeaker employing a CAM according to an exemplary embodiment.
Figure 3B:
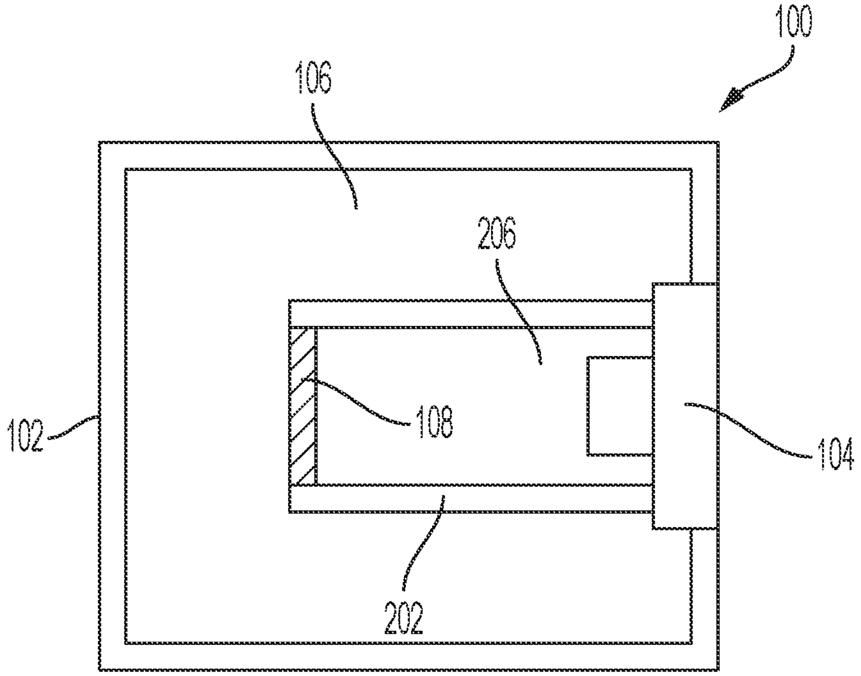

FIGS. 3A and 3B illustrate a loudspeaker employing a CAM according to an exemplary embodiment.

FIGS. 3A and 3B include elements that are substantially similar to those described with respect to FIGS. 1A, 1B, 2A, and 2B, and thus a description of those elements will not be repeated.

In FIGS. 3A and 3B, the secondary enclosure 202 is at least one of attached to, integrated with, or surrounding the driver 104. Here, the secondary enclosure 202 may have any shape that forms the secondary void 206 (e.g., a cylinder, a rectangular prism, pyramid, etc.). The CAM 108 may be disposed at an opening in the secondary enclosure 202. In this case, the secondary enclosure 202 may be mounted to the driver 104 via its own frame, or directly to a frame of the driver 104. Similar to FIGS. 2A and 2B, in FIGS. 3A and 3B the volume of the secondary void 206 may be the same as or different than the volume of the void 106. In the case in which the volume of the secondary void 206 different than the volume of the void 106, the volume of the secondary void 206 may be lessor than the volume of the void 106, or the volume of the secondary void 206 may be greater than the volume of the void 106.

In FIGS. 3A and 3B, when the secondary enclosure 202 is a cube, the CAM 108 may be rectangular instead of square, thereby increasing the size of the CAM 108. In another case, when the secondary enclosure 202 is a cylinder, the CAM 108 may be an oval instead of circle, thereby increasing the size of the CAM 108. When CAM 108 is disposed at an angle offset from a cross-sectional plane of the secondary enclosure 202, this allows a CAM 108 to be installed having a greater surface area than the CAM 108 disposed parallel to or in a cross-sectional plane of secondary enclosure 202.

The secondary enclosure 202 may be omitted with the CAM 108 being disposed directly to the rear of driver 104 and attached to driver 104. In this case, the CAM 108 may be rigidly mounted to the driver 104 via its own frame, or directly to the frame of the driver 104. Additionally, the CAM 108 may be any shape, such a curvilinear, dome, planar, etc.

Further, in FIGS. 3A and 3B, an additional driver may be included with the enclosure 102, the one or more additional drivers may operate opposite to the driver 104, or in sync with the driver 104. Also, in FIGS. 3A and 3B, an additional CAM may be disposed in an opening in the enclosure 102. The enclosure 102 may include a port from inside the void 106 to outside the enclosure 102. The port may have at least one of a length or cross-sectional area determined by the target low frequency. The port may have a wall of at least one of a substantially constant thickness over at least one of its cross-sectional shape or length, or a thickness that varies over at least one of its cross-sectional shape or length.

Figure 4A:
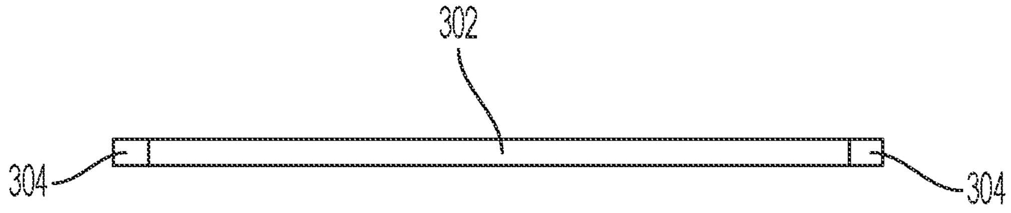
FIGS. 4A and 4B illustrate a CAM according to an exemplary embodiment.
Figure 4B:
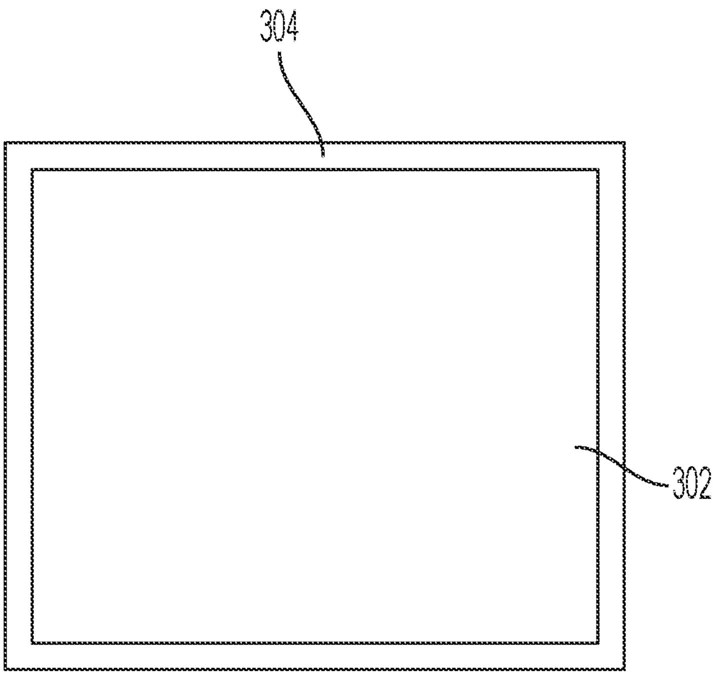

FIGS. 4A and 4B illustrate a CAM according to an exemplary embodiment.

Referring to FIGS. 4A and 4B, the CAM 108 may include at least one membrane 302 that is flexible and disposed across an opening in at least one of the enclosure 102 or the secondary enclosure 202.

The CAM 108 may include a frame 304 to which the membrane 302 is attached, and the frame 304 may be attached to the wall of at least one of the enclosure 102 or the secondary enclosure 202. In the case in which the membrane 302 is attach to the frame 304 and the frame 304 is attached to the wall of at least one of the enclosure 102 or the secondary enclosure 202, the frame 304 may be disposed in line with the wall, attached to an interior portion of the wall, or attached to an exterior portion of the wall. In the case in which the membrane 302 is attach to the frame 304 and the frame 304 is attached to the wall of at least one of the enclosure 102 or the secondary enclosure 202, the frame 304 may be configured to be extended into or out of the at least one of the enclosure 102 or the secondary enclosure 202.

The CAM 108 may omit the frame 304. In this case, the membrane 302 may attach to the wall of at least one of the enclosure 102 or the secondary enclosure 202. In the case in which the membrane 302 is attach to the wall of the at least one of the enclosure 102 or the secondary enclosure 202, the membrane 302 may be disposed in line with the wall, attached to an interior portion of the wall, or attached to an exterior portion of the wall.

The membrane 302 may be any shape such as square, rectangular, circular, oval, triangular, etc. The shape of the membrane 302 may correspond to the shape of, or be different than the shape of, the opening in the secondary enclosure 202 where the CAM 108 is disposed. The membrane 302 may be any size relative to the opening in the secondary enclosure 202 where the CAM 108 is disposed. In the case in which there is a distance between the wall of at least one of the enclosure 102 or the secondary enclosure 202 and the membrane 302, that distance may be occupied by the frame 304.

The membrane 302 may formed using a single membrane or plural membranes. In the case in which there are plural (2 or more) membranes, a first membrane may be disposed directly over a second membrane with no gap therebetween, or a first membrane may be disposed directly over a second membrane with a sealed airgap therebetween. In each of the above configurations of membrane 302 being formed with plural membranes, the first membrane may have different material characteristics than the second membrane, or the first membrane may have the same material characteristics as the second membrane.

The membrane 302 may be radially pre-stretched (stressed) in any of the mounting configurations described or inferred herein. The membrane 302 may be made from of a number of flexible materials, including rubber, foam rubber, polyvinyl chloride (PVC) derivatives, inasmuch as the material has elastic properties (elasticity) and returns to its stable state or original form. The overall cross-sectional thickness of the membrane 302 may vary depending on desired tuning characteristics and membrane elastic modulus properties, and the cross-sectional thickness may vary within a planar section over its length. The radial pre-stretching of the membrane may allow Hooke's Law to apply, and thereby may allow for ease of manufacturing and repeatable performance. The surface area of the membrane 302 may typically be 35% or less of the total surface area of the enclosure 102.

Figure 5A:
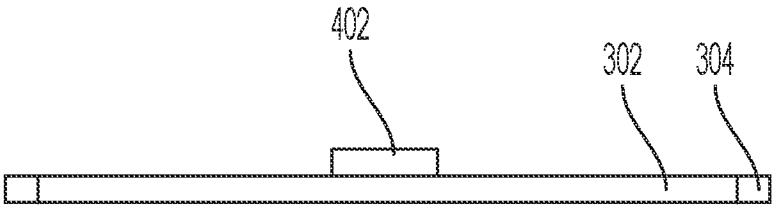
FIGS. 5A and 5B illustrate a CAM according to an exemplary embodiment.
Figure 5B:
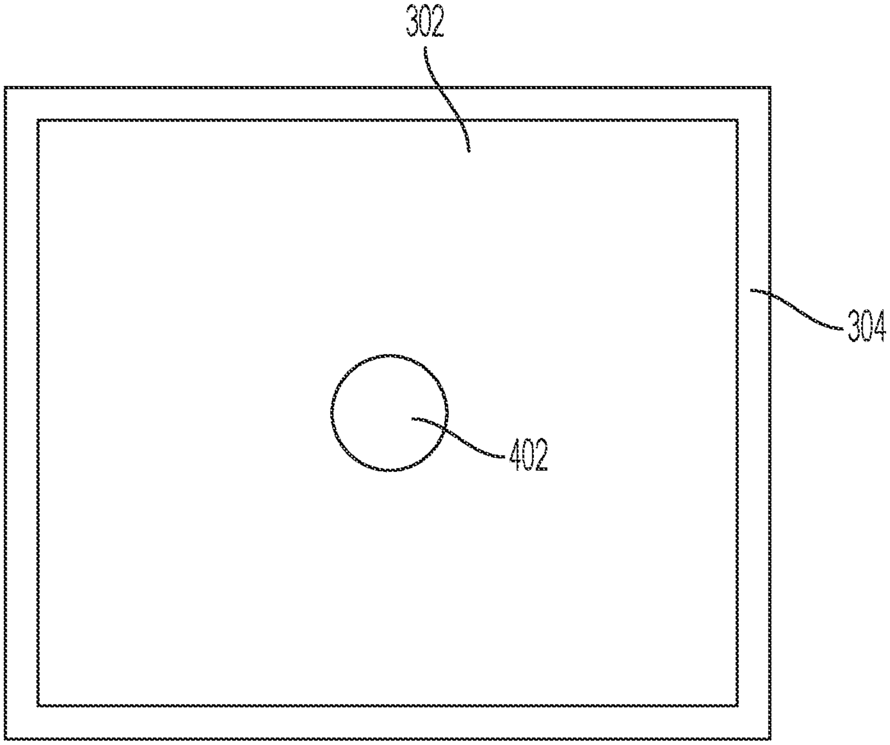

FIGS. 5A and 5B illustrate a CAM according to an exemplary embodiment.

FIGS. 5A and 5B include elements that are substantially similar to that described with respect to FIGS. 4A and 4B, and thus a description of those elements will not be repeated. However, FIGS. 5A and 5B include an additional element not shown in FIGS. 4A and 4B. In particular, the CAM 108 shown in FIGS. 5A and 5B include a mass 402.

Referring to FIGS. 5A and 5B, at least one mass 402 is disposed on the membrane 302 to dampen vibrations. The mass 404 may have a diameter that is greater than its thickness. The diameter of the mass 404 may not exceed the width of one half of the diameter of the membrane 302. The mass 404 may be provided on a side of the membrane 302 that is opposite the void 106, a side of the membrane 302 that is facing the void 106, or integral to the membrane 302. The mass 404 may be provided in plural with a first mass being provided on a side of the membrane 302 that is opposite the void 106, and a second mass being provided a side of the membrane 302 that is facing the void 106. The mass 404 may be provided in plural such that the plural masses may be provided on a side of the membrane 302 that is opposite the void 106, a side of the membrane 302 that is facing the void 106, or integral to the membrane 302.

Figure 6A:
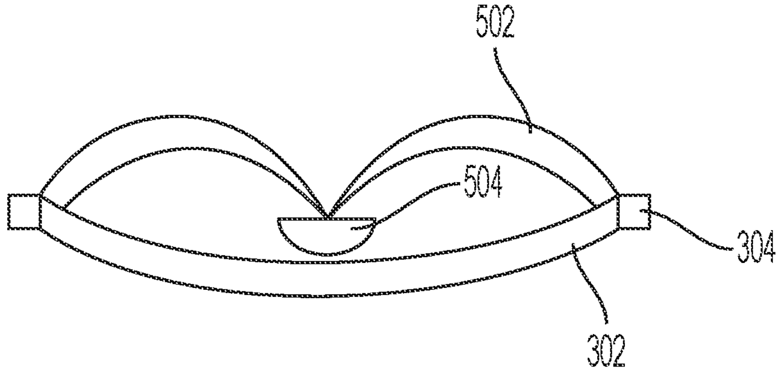
FIGS. 6A and 6B illustrate a CAM according to an exemplary embodiment.
Figure 6B:
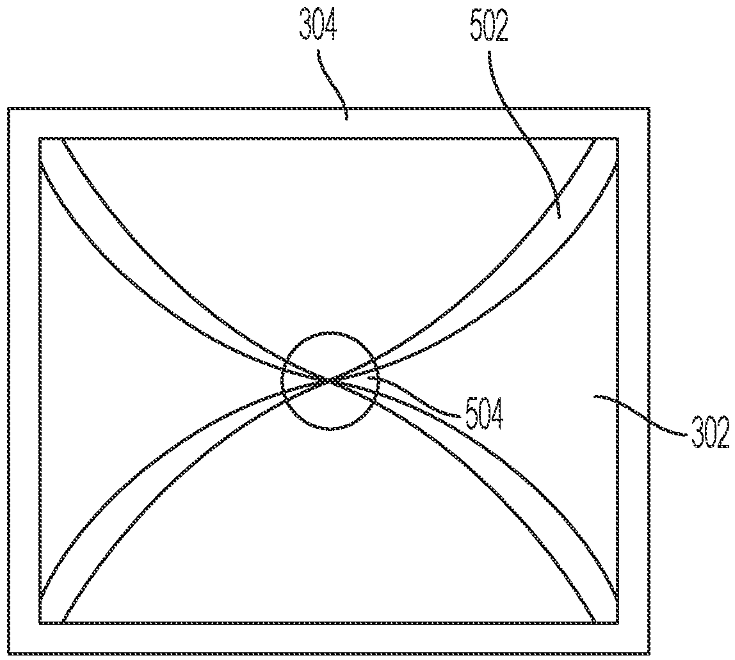

FIGS. 6A and 6B illustrate a CAM according to an exemplary embodiment.

FIGS. 6A and 6B include elements that are substantially similar to that described with respect to FIGS. 4A and 4B, and thus a description of those elements will not be repeated. However, FIGS. 6A and 6B include additional elements not shown in FIGS. 4A and 4B. In particular, the CAM 108 shown in FIGS. 6A and 6B include at least one tuning arm 502 that supports at least one contact member 504.

Referring to FIGS. 6A and 6B, the CAM 108 may include at least one tuning arm 502 that supports at least one contact member 504. The tuning arm 502 may be formed in the shape of a web, a grid, a single arm, a plurality of arms, or any other configuration that disposes the contact member 504 against the membrane 302.

The tuning arm 502 may have a compliant nature, be rigid, be equipped with a spring, or other component or combinations of components that provides static or variable linear downforce to at least one side of the membrane 302 via the contact member 504. Here, the static or variable linear downforce may be provided to the center section of at least one side of the membrane 302. However, the static or variable linear downforce may be provided to another section of at least one side of the membrane 302.

In an example, a first combination of the tuning arm 502 and the contact member 504 may provide the static or variable linear downforce to a side of the membrane 302 facing away from the void 106. A second combination of the tuning arm 502 and the contact member 504 may additionally or attentively provide the static or variable linear downforce to a side of the membrane 302 facing the void 106.

The contact member 504 may have a spherical, semi spherical, flat, rounded, or any profile that does not puncture the membrane. The contact member 504 may be provided in plural.

At least one of the radial pre-stretching of the membrane 302 or tuning arm 502 may allow Hooke's Law to apply, and thereby may allow for ease of manufacturing and repeatable performance.

Figure 7A:
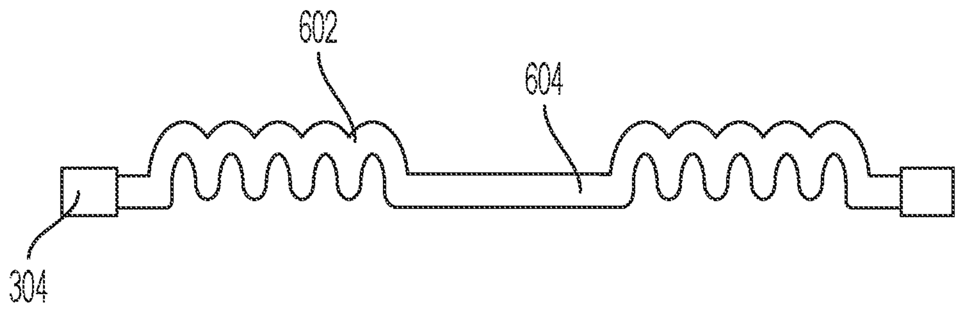
FIGS. 7A and 7B illustrate a CAM according to an exemplary embodiment.
Figure 7B:
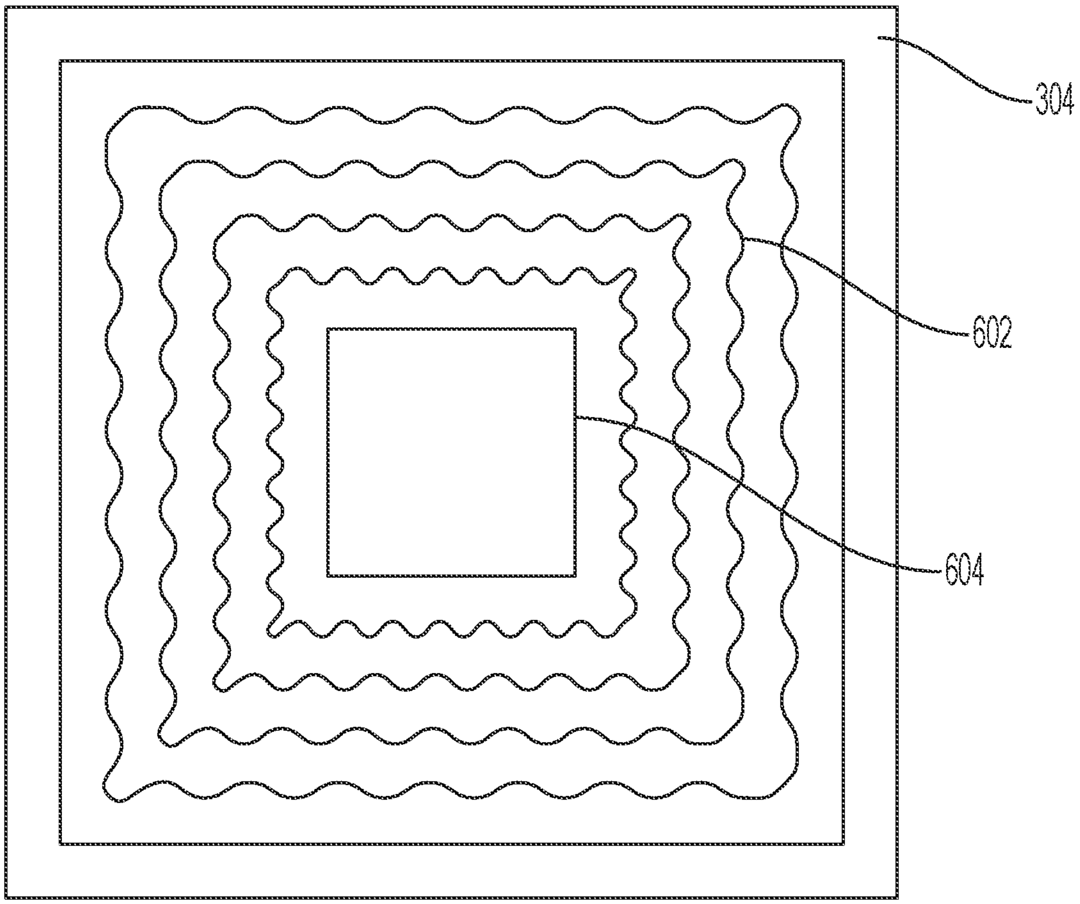

FIGS. 7A and 7B illustrate a CAM according to an exemplary embodiment.

FIGS. 7A and 7B include frame 304 that is substantially similar to frame 304 described with respect to FIGS. 4A and 4B, and thus a description of frame 304 will not be repeated.

Referring to FIGS. 7A and 7B, instead of membrane 302, the CAM 108 may include at least one concentric rubber surround 602 with a center mass diaphragm 604.

Like the case in which the CAM 108 includes membrane 302, the case in which the CAM 108 includes at least one concentric rubber surround 602 with a center mass diaphragm 604. As shown in FIGS. 7A and 7B, five rolls of concentric rubber surrounds 602 are included. However, a smaller or greater number of concentric rubber surrounds 602 may be utilized.

In the case in which the CAM 108 includes at least one concentric rubber surround 602 with a center mass diaphragm 604, the CAM 108 may be tuned due to a resistance of movement of the center mass diaphragm 604 provided by at least one of a weight of the center mass diaphragm 606 or the at least one concentric rubber surround 602. Here, the CAM 108 that includes the at least one concentric rubber surround 602 with the center mass diaphragm 604 may be tuned not for sound, but to tune at least one of the enclosure 102 or the driver 104.

According to an embodiment, a loudspeaker is provided that may include an opening, a driver, disposed at the opening in the enclosure, which is configured to be electrically driven. and a constrained acoustic modulator (CAM), disposed at the enclosure, which is not configured to be electrically driven. The CAM is configured to tune the enclosure without the CAM substantially radiating audible sound.

According to an embodiment, the enclosure may include another opening, and the CAM may be disposed at the other opening in the enclosure.

According to an embodiment, a side of the CAM facing away from the enclosure may be enclosed by another enclosure.

According to an embodiment, the other enclosure may be airtight.

According to an embodiment, the other enclosure may include at least one port that vents air between an inside and an outside of the other enclosure.

According to an embodiment, the other enclosure may be integral to the enclosure.

According to an embodiment, the enclosure may be airtight.

According to an embodiment, the enclosure may include at least one port that vents air between an inside and an outside of the enclosure.

According to an embodiment, the CAM may include a membrane that is radially and linearly flexible.

According to an embodiment, the CAM may include a tuning member that mechanically provides a linear downforce to the membrane.

According to an embodiment, the CAM may include a tuning member that provides a mass load to a portion of the membrane.

According to an embodiment, the CAM may include a center mass diaphragm suspended by an elastic surround.

According to an embodiment, the CAM forms an airtight void between the CAM and a side of the driver facing the enclosure.

According to an embodiment, the CAM may be attached to the driver.

According to an embodiment, the CAM may be disposed between a side of the driver facing the enclosure and a void inside the enclosure.

According to an embodiment, the CAM may be disposed across an entire side of the enclosure.

According to an embodiment, the loudspeaker includes another CAM, disposed at the enclosure, which is not configured to be electrically driven.

According to an embodiment, the CAM may be configured to tune the enclosure so as to enable a smaller volume for the enclosure to be used for the loudspeaker to achieve a given performance.

According to an embodiment, the CAM may be configured to at least one of equalize or tune a volume of the enclosure while the driver is being driven so as to reduce an acoustic resistive force applied to the driver by the enclosure.

According to an embodiment, the CAM may be configured to tune the enclosure to lower a Qtc of the loudspeaker.

While some features that are common to some embodiments have been discussed above, not all features that are common have been discussed above and not all features discussed above are common to all embodiments. Further, it would be apparent to one of skill in the art that variations to the location, dimensions, angles, radiuses, number of parts, and the like, may be made within the scope of the disclosure. That is, any combination of any aspect of any of the embodiments described or illustrated herein either explicitly, inherently, or implicitly are an embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed:

1. A loudspeaker comprising:

an enclosure including an opening;

a driver, disposed at the opening in the enclosure, which is configured to be electrically driven; and a constrained acoustic modulator (CAM) including a membrane disposed across the CAM, wherein a perimeter of the membrane is attached to one of a frame of the CAM or a surface of the enclosure, and an entirety the membrane is flexible, wherein a first airtight void is formed in the enclosure by at least: a side of the driver facing inside the enclosure and a first side of the CAM, wherein a second airtight void is formed in the enclosure by at least: at least a portion of an inner surface of the enclosure and a second side of the CAM, and wherein the first airtight void and the second airtight void are airtight with respect to each other, regardless of motion of at least a portion of the CAM.

2. The loudspeaker of claim 1, wherein the first airtight void is larger than the second airtight void.

3. The loudspeaker of claim 1, wherein the enclosure includes a first part of the enclosure and a second part of the enclosure.

4. The loudspeaker of claim 3, wherein the opening in the enclosure is a first opening disposed in the first part of the enclosure, wherein the first part of the enclosure includes a second opening, wherein the second part of the enclosure includes a third opening, and wherein the CAM is disposed at the second opening and the third opening.

5. The loudspeaker of claim 4, wherein the first airtight void is formed by at least: the side of the driver facing inside the first part of enclosure, the first side of the CAM, and at least a portion of an inside surface of the first part of enclosure, and wherein the second airtight void is formed by at least: at least a portion of an inside surface of the second part of enclosure and the second side of the CAM.

6. The loudspeaker of claim 3, wherein the first part of the enclosure and the second part of the enclosure are integrally formed.

7. The loudspeaker of claim 3, wherein the first part of the enclosure and the second part of the enclosure are separately formed.

8. The loudspeaker of claim 1, further comprising:

another enclosure disposed inside the enclosure, wherein the first airtight void is formed by at least: the side of the driver facing inside the enclosure, the first side of the CAM, and at least a portion of an inner surface of the another enclosure, and wherein the second airtight void is formed by at least: the at least the portion of the inner surface of the enclosure, the second side of the CAM, and at least a portion of an outer surface of the another enclosure.

9. The loudspeaker of claim 1, wherein the CAM is configured to tune the enclosure without the CAM substantially radiating audible sound.

10. The loudspeaker of claim 1, wherein the CAM is disposed across an entire cross section of the enclosure.

11. The loudspeaker of claim 1, wherein the CAM is configured to tune the enclosure so as to enable a smaller volume for the enclosure to be used for the loudspeaker to achieve a given performance.

12. The loudspeaker of claim 1, wherein the CAM is configured to at least one of equalize or tune a volume of the enclosure while the driver is being driven so as to reduce an acoustic resistive force applied to the driver by the enclosure.

13. The loudspeaker of claim 1, wherein the CAM is configured to tune the enclosure to lower a Qtc of the loudspeaker.

14. The loudspeaker of claim 1, wherein the second airtight void provides a provides resistive load to the CAM.

15. The loudspeaker of claim 1, wherein the membrane is elastic.

16. The loudspeaker of claim 15, wherein the membrane is formed of rubber.

17. The loudspeaker of claim 1, wherein the CAM includes a tuning member that provides a mass load to a portion of the membrane.

18. The loudspeaker of claim 1, wherein the CAM does not include a cone that radiates sound.

* * * * *